United States Patent [19]
Gray

[11] Patent Number: 6,034,594
[45] Date of Patent: Mar. 7, 2000

[54] MOTORCYCLE WARNING DEVICE

[76] Inventor: William R. Gray, 5321 Blue Sage Dr., Raleigh, N.C. 27606

[21] Appl. No.: 09/175,489

[22] Filed: Oct. 20, 1998

[51] Int. Cl.[7] ................................................. B60Q 1/00
[52] U.S. Cl. .................. 340/440; 340/427; 340/429; 340/438; 280/755; 180/282; 116/28 A
[58] Field of Search ................ 340/425.5, 427, 340/429, 432, 437, 438, 439, 440; 280/755; 180/282, 283; 116/28 A

[56] References Cited

U.S. PATENT DOCUMENTS

| | | |
|---|---|---|
| 1,085,608 | 2/1914 | Heath . |
| 4,145,682 | 3/1979 | Cook . |
| 4,200,167 | 4/1980 | Moog . |
| 4,682,145 | 7/1987 | Brawner, Jr. . |
| 4,828,069 | 5/1989 | Hatsuyama . |
| 4,972,595 | 11/1990 | Shimamura et al. . |
| 5,613,571 | 3/1997 | Rank et al. . |
| 5,704,813 | 1/1998 | Weeks et al. . |
| 5,765,290 | 6/1998 | Rank et al. ................. 33/365 |
| 5,777,290 | 7/1998 | Tzanev ..................... 200/61.52 |

*Primary Examiner*—Daryl Pope
*Attorney, Agent, or Firm*—Harter, Secrest & Emery LLP; Brian B. Shaw

[57] ABSTRACT

A warning device to warn drivers of two wheeled vehicles of an approaching critical angle is disclosed. The warning device may include a sensing device and a separate signaling device. The sensing device may be a pendulum, bubble within a tube of fluid, a proximity sensor, or a mechanical whisker. The signaling device may be a buzzer, beeper, or lighted bulb. The sensing device sends a signal to the signaling device when a predetermined angle, greater than the critical angle, is reached so that the operator has time to react to the information prior to the vehicle tipping or contacting the ground. The warning device may be attachable to a bar of the vehicle or placed atop the vehicle and Is preferably easily installed by the motorcycle owner/driver. A method for warning a driver is also disclosed.

29 Claims, 7 Drawing Sheets

MOTORCYCLE WARNING DEVICE

FIELD OF THE INVENTION

The present invention relates to motorcycle safety, and more particularly, to a warning system for advising a motorcycle rider of a potential for tipping or for contacting a non-rotating portion of the motorcycle with the ground.

BACKGROUND OF THE INVENTION

Vehicles, such as motorcycles, are inherently unstable, and their use, particularly by inexperienced drivers, can be dangerous. Many factors such as excessive speed, road conditions, driver experience, poor equipment, and overtipping can contribute to accidents. The present invention relates to a device which can help prevent accidents which might otherwise occur when a vehicle is approaching a critical tilting angle.

The prior art discloses some tip sensors within a vehicle. U.S. Pat. No. 1,085,608 to Heath et al and U.S. Pat. No. 5,613,571 to Rank et al both disclose tip sensors within a vehicle for sensing a critical tilting angle, however the tip sensors do not sense an approaching critical angle nor do they provide any visible or auditory signals so that the driver may correct the vehicle's angle prior to reaching the critical angle. Instead, at the critical tilting angle, the prior tip sensors activate a circuit breaker to provide automatic shut-off of the machine. The driver must then restart the engine, which can be a nuisance. Thus, the driver may not be aware that a critical angle has been reached until the vehicle shuts off.

U.S. Pat. No. 4,200,168 to Moog discloses an apparatus for sensing the application of an overturning moment to the vehicle and for exerting a reaction torque on the vehicle to oppose such overturning moment by means of an inertia wheel. The apparatus described would greatly increase the size and weight of a vehicle, both of which are undesirable features when the space for performance related features on vehicles such as motorcycles is particularly limited. Again, no visible or audible warning is provided to the driver of an impending critical angle which allows a driver to correct a leaning position.

U.S. Pat. No. 4,145,682 to Cook and U.S. Pat. No. 4,682,145 to Brawner, Jr. disclose truck level sensors and indicators, but do not apply to vehicles such as motorcycles which are in driving mode, nor do they sense the proximity of a vehicle to the ground.

Thus, there is a need for a tilt angle sensor which can provide a visible or audible warning signal to a driver that the motorcycle is approaching a critical tilting angle so that the driver may correct the vehicle's tilting angle and prevent overturning of the vehicle. There is further a need for such a signal which can be used while driving and which allows the driver to continue driving after self-correction. There is further a need for such an apparatus which is inexpensive and which can be easily attached to an existing vehicle. There is a need for a device which can assist a motorcycle driver in avoiding unintended contact between the motorcycle and the ground.

SUMMARY OF THE INVENTION

With the above needs in mind, it is an object of the present invention to provide a warning device to a driver so that the driver may react to the information that a critical tipping angle is being approached, without the need for restarting the engine.

It is a further object of the present invention to provide a warning device which may be easily attached to the frame of a motorcycle.

It is an additional object of the present invention to provide a sensor which measures the distance between the ground and the vehicle and activates a signal receivable by the driver when a certain distance is read by the sensor.

It is yet another object of the present invention to provide a sensor which moves relative to the movement of the vehicle to which it is attached and which activates a switch when a certain amount of movement is detected, the switch being electrically connected to a visible or auditory signal receivable by the driver such as a buzzer or a light.

It is a further object of the present invention to provide a mechanical warning device in the form of a wire whisker which extends from the frame of the vehicle and which contacts the ground thereby activating a switch and warning the driver before non-rotating portions of the vehicle contact the ground when tilting.

It is yet another object of the present invention to provide a device which may be adjusted to detect different tilting angles so that the device may be custom fitted on the vehicle and the driver's performance abilities.

The present invention provides a warning device for sensing an approaching critical tilting angle and providing a driver with a visible or auditory warning so that the driver may correct the angle to avoid a dangerous situation such as overturning which may occur if a non-rotating portion of the vehicle contacts the ground or to avoid contacting a nonrotating portion of the motorcycle with the ground.

Control over a motorcycle may be reduced, if during cornering, the motorcycle is generally leaned from a perpendicular position with respect to the ground by a sufficient angle to contact a non-rotating portion of the motorcycle with the ground. The present invention is generally directed to warning the rider upon the motorcycle that a potentially dangerous lean angle is approaching. Alternatively stated, the present invention alerts a motorcycle driver of impending contact between the ground and a nonrotating portion of the motorcycle.

A warning signal corresponding to the tilt of the motorcycle may be created by use of a proximity sensor, a mechanical whisker which contacts the ground, or a level, such as a fluid or a bubble and fluid combination, or a pendulum, that actuates a switch upon a predetermined lean angle being attained.

Other objects, features, and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
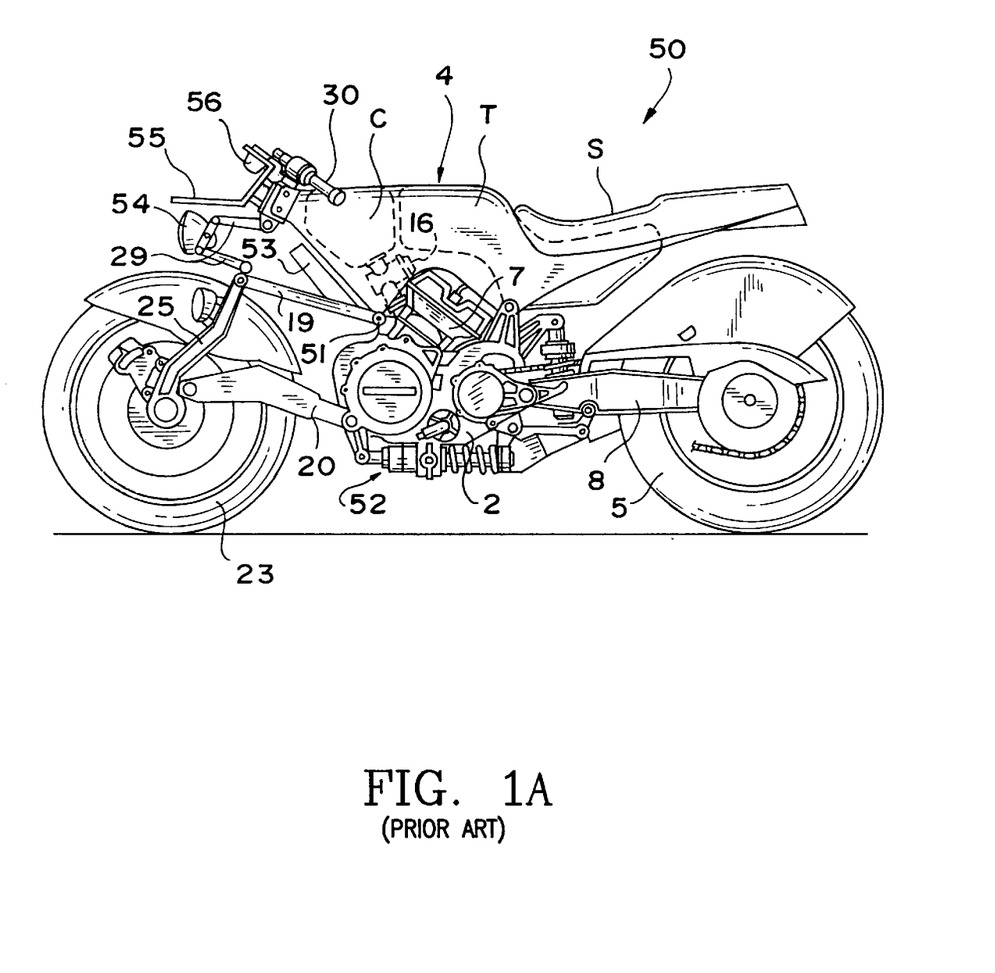
FIG. 1A shows a side view of a prior art motorcycle to which the present invention may be attached.

FIG. 1A shows a typical motorcycle with which the present invention may be employed. The motorcycle 50 comprises an engine unit 2, a body 4, a rear wheel 5, cylinder 7, rear fork 8 rotatably supporting the rear wheel 5, carburetor 16, upper front arm 19, lower front arm 20, front wheel 23, knuckle 25, steering links 29, handlebar 30, boss 51 on the front face of cylinder 7, front damper 52 disposed below engine unit 2, radiator 53, head lamp 54, rack 55, and gauge meters 56. The motorcycle 50 further comprises an air cleaner C which is disposed within the body 4, saddle S for seating, and tank T as part of body 4. Of course, other styles of motorcycles may also take advantage of the present invention. The motorcycle shown is for example only and not to be restrictive of the type of vehicle in which the present invention may be utilized. In addition, the present invention may also be adapted to fit onto bicycles and other similar two wheeled vehicles to take advantage of the above described objects and advantages of the present invention.

Figure 1B:
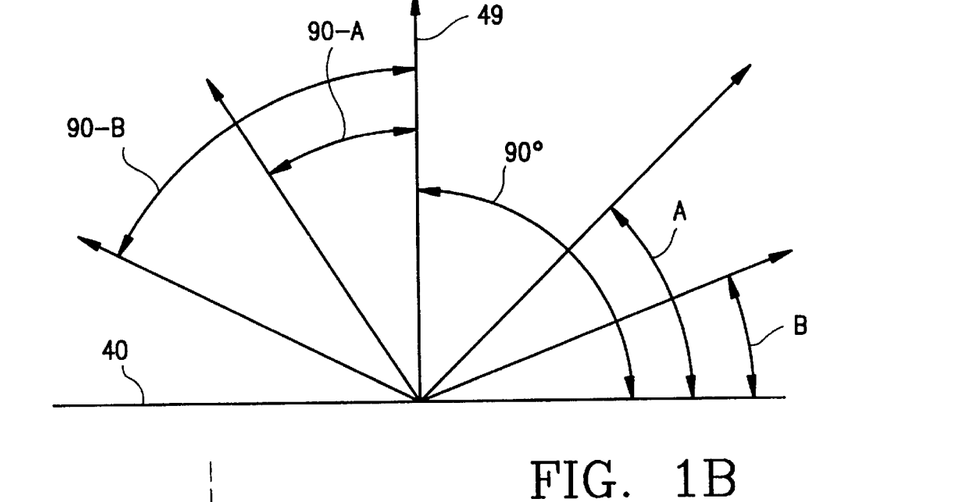
FIG. 1B shows angles with which a motorcycle may tilt with respect to the ground and with respect to the motorcycle's upright position.

FIG. 1B shows an axis 49 of the motorcycle 50 undergoing various tilt angles. When the axis 49 is perpendicular to the ground 40, the motorcycle 50 is completely upright. When a motorcycle 50 is inclined, or leaned during operation, it is important that only the wheels contact the road. That is, if a non-rotating portion of the motorcycle such as the frame or foot rest contacts the ground when the motorcycle is cornering, such contact could sufficiently jolt the balance of the motorcycle 50 and rider to cause a loss of control.

Thus, there is a critical angle beyond which contact between a nonrotating portion of the motorcycle and the ground will occur. This critical angle is defined as B in FIG. 1B when reading the angle from the ground 40 to the motorcycle 50 or as 90-B when reading the angle from a 90° position from the ground 40 to the motorcycle 50. The present invention provides a signal in response to the motorcycle 50 being inclined to a predetermined angle 90-A relative to the motorcycle in the upright position, which is more upright than the critical angle 90-B. Alternatively worded, the present invention provides a signal in response to the motorcycle being inclined to a predetermined angle A relative to the ground 40, which is greater than the critical angle B of the motorcycle 50 relative to the ground 40. Generally, the tilt angle is the angle between a plane orthogonal to the axis of rotation of a wheel 5, 23 and the ground 40. It is recognized that the tilt angle of the front wheel 23 and the rear wheel 5 may not be equal. It is contemplated that an average, the front 23 or the rear wheel 5 tilt angle may be employed to compare to the critical angle 90-B. As the rear wheel 5 is generally fixed in a coplanar relation with the body of the motorcycle 50, the angle of inclination of the frame or body may also be used.

As can be seen in FIGS. 2–7, a first embodiment of the present invention comprises a mechanical sensing device for detecting an approaching critical tilt angle. The device can be attached to a motorcycle or other vehicle during production, or can be an purchased later as a separate attachment which can easily be attached by the operator.

Figure 2:
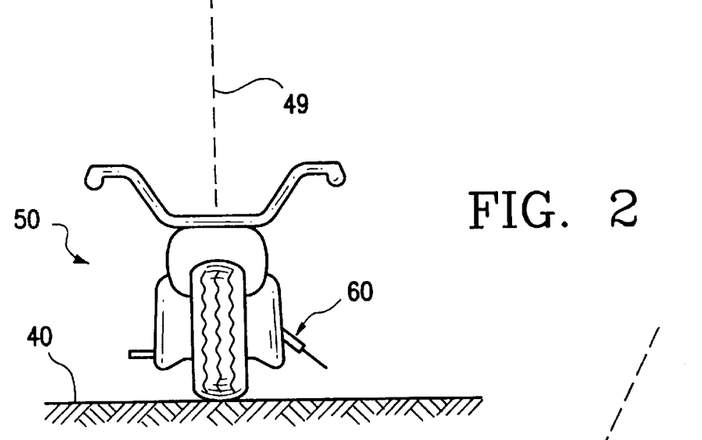
FIG. 2 shows a front view of a motorcycle with a first embodiment of the present invention attached.
Figure 3:
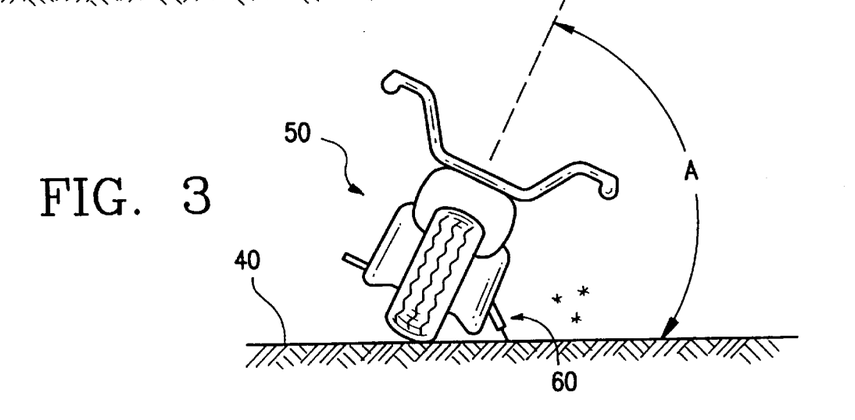
FIG. 3 shows a front view of an angled motorcycle with a first embodiment of the present invention attached.

FIGS. 2 and 3 show the device, which generally comprises a whisker 60, attached to motorcycle 50. The whisker 60 includes or is operably connected to a switch 63. The switch 63 toggles between an open and a closed position. Preferably, the switch 63 (and whisker 60) are biased to the open position, and may be displaced to the closed position upon contact with the ground. The location of attachment depends on the style of motorcycle employed, but would generally be on a lower portion of the motorcycle or frame, such as lower front arm 20. When the vehicle is operated with the motorcycle generally perpendicular to the ground 40 as shown in FIG. 2, the whisker 60 does not contact the ground 40. Small movements of the vehicle also do not result in the whisker 60 contacting the ground 40. That is, the operator may make comers which put the vehicle within a certain angle of the ground 40 which does not represent an angle B which would put the operator in jeopardy of tipping the vehicle or contacting a non-rotating portion of the vehicle with the ground 40. As such an angle B is approached, however, the whisker 60 contacts the ground 40 at the angle A from the ground 40 as shown in FIG. 3. Of course, contact between the whisker 60 and the ground 40 is most useful at the angle A from the ground, prior to the angle B from the ground 40 which would result in the vehicle tipping over. Thus, when contact is made between the whisker 60 and the ground 40, the switch 63 is closed and the signal is provided to the driver. The signal may be audio or visually indicate that a critical tipping angle is approaching. If the signal is only an audible one, it may be included within the body 64 of the whisker 60. Alternatively, if the signal is visible and/or audible, an electrical wire connector 106 may connect the whisker 60 to a signaling device 108, as shown, for example, in FIGS. 14 and 15 in a further embodiment, with the signaling device 108 positioned in plain view of the driver. Although only shown on one side of the vehicle 50, it would be most advantageous if the whisker 60 were employed on both sides of the vehicle 50, and such duplication can readily be envisioned with the current invention.

Figure 4:
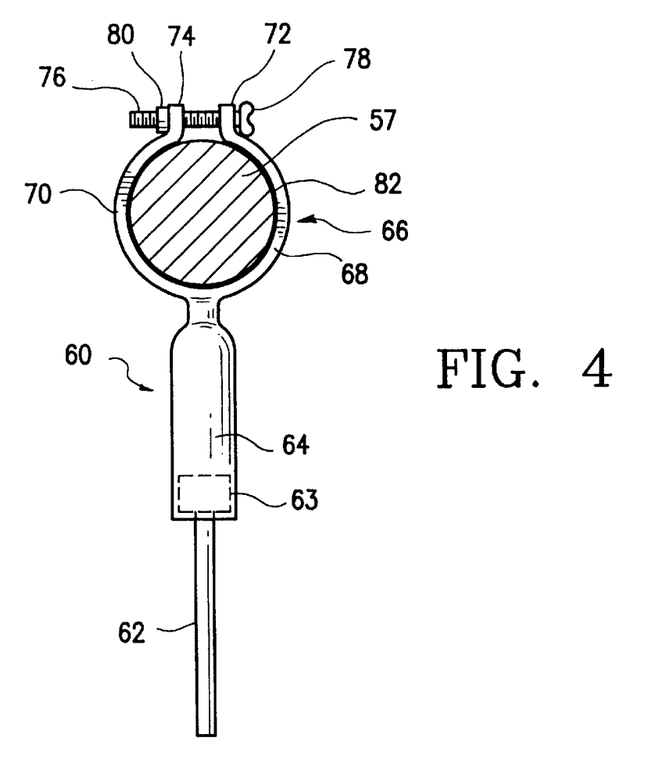
FIG. 4 shows a side view of a warning device according to the first embodiment of the present invention.

FIG. 4 shows one embodiment of the mechanical whisker. The whisker 60 is provided with a single wire 62 which serves as the contacting medium between the whisker 60 and the ground 40. The wire 62 is preferably thin enough so as not to disrupt the driver's course when contact is made with the ground. The wire 62 is also preferably rigid enough so that wind resistance does not provide false signals. In a preferred embodiment, the wire 62 is made from 0.93 inch diameter metal.

The wire may extend from a body 64 which serves to house the microswitch 63 and further serves to connect the wire 62 to an attachment device 66. The attachment device 66 may connect the whisker 60 to a bar 57 on the motorcycle 50. The bar 57 may be lower front arm 20 or other bar located near a lower end of the motorcycle 50. The attachment device 66 may comprise a pair of arms 68 and 70 which together form a tension clip. Thus, the arms 68 and 70 may be pried apart just enough to allow the bar 57 to pass between the arms 68, 70. When the bar 57 is positioned within the tension clip, the arms 68 and 70 are returned to their normal biased position to hold the bar 57 therebetween. The arms 68 and 70 may adequately hold the whisker 60 in place on the bar 57, however if additional security is desired, the ends 72 and 74 of the arms 68 and 70, respectively, may be provided with through holes (not shown) through which may pass a threaded turn screw 76, preferably having an easily graspible head 78, such as the kidney bean shape shown. A nut 80 may be threaded onto the end of the screw 76 and the head 78 and nut 80 may be moved as close as possible towards each other to press the arms 68 and 70 tighter against the bar 57. In addition, the arms 68 and 70 of the attachment device 70 may be lined with a layer of non-slip material 82 such as an elastomeric rubber which will prevent the attachment device 66 from rotating about the bar 57 when securely attached.

Figure 5:
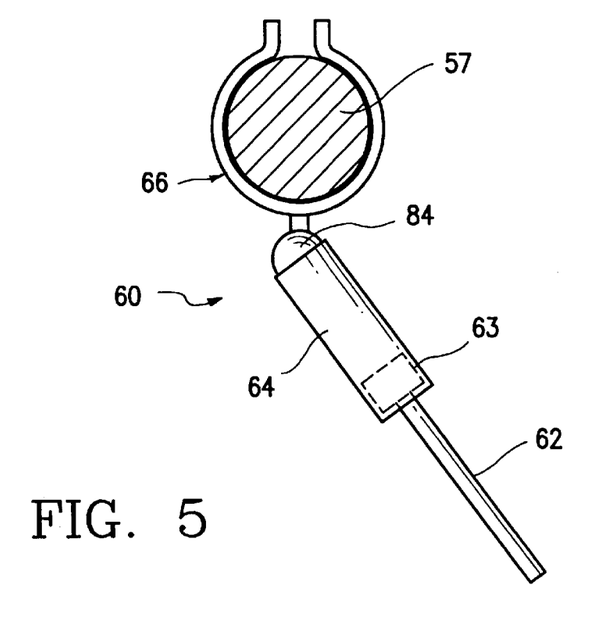
FIG. 5 shows side view of a warning device according to the first embodiment of the present invention and incorporating a jointed body.
Figure 6:
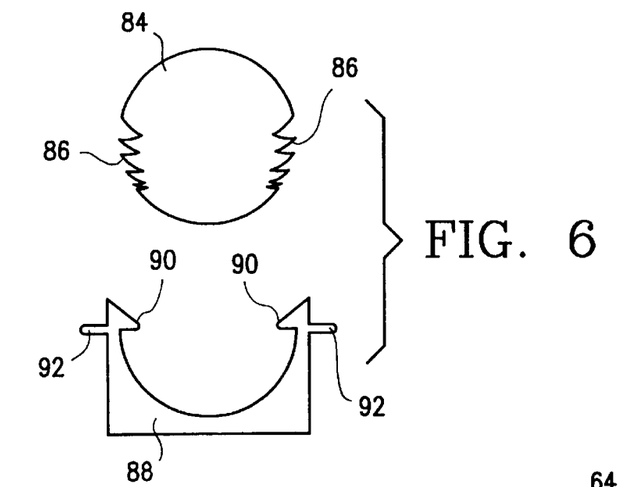
FIG. 6 shows a side cross-sectional view of a ratcheting joint for use with the first embodiment of the present invention.

It may at times be desirable to change the angle of the whisker 60 relative to the motorcycle 50. For example, if a less skilled driver will be using the same motorcycle 50 on which the whisker 60 is installed, the original operator may wish to angle the whisker 60 further towards the lower end of the motorcycle 50 so that the whisker 60 contacts the ground sooner than it would otherwise. That is, a less skilled operator may prefer a larger angle A from the ground and a smaller tilting angle 90-A of the motorcycle from its upright position. Thus, as shown in FIG. 5, the whisker 60 may include a joint 84 which allows the wires 62 to pivot relative to the attachment device 66. The joint 84 may be a friction retaining joint to retain the selected angle, or alternatively, as shown in FIG. 6, the joint 84 may include ratcheting teeth 86. The joint 84 may be seated within seat 88 having at least one catch 90 which secures the joint 84 in a selected angle. The seat 88 may be part of the body 64 or may be a separate element attached to the proximal end of the body 64. The seat 88 further may have arms 92 which can be pulled to release the joint 84 from its ratcheted position. Other methods of retaining the joint 84 in a selected angular position are also within the scope of this invention.

Figure 7:
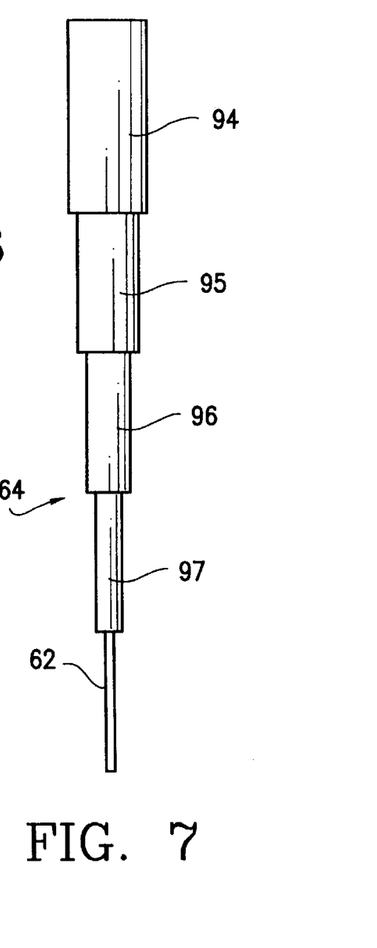
FIG. 7 shows a side view of a telescopic body for use with the first embodiment of the present invention.
Figure 8:
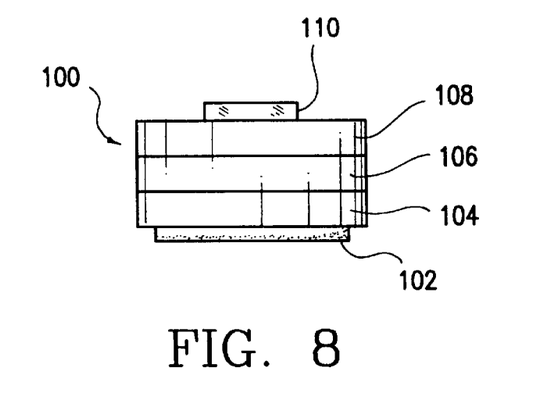
FIG. 8 shows a side plan view of a warning device according to an alternate embodiment of the present invention.
Figure 9:
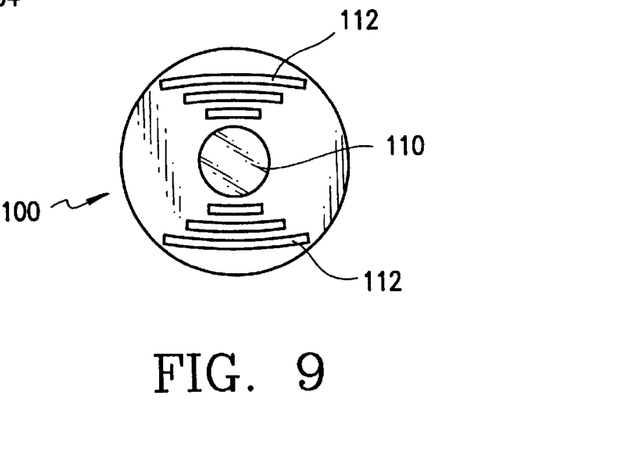
FIG. 9 shows a top plan view of the warning device of FIG. 8.

Turning now to FIG. 7, the body 64 may be made from several telescopically connected segments 94, 95, 96, and 97 which can extend or shorten the length of the body 64. This may be helpful when setting up the whisker 60 on vehicles of various dimensions and framing structures. Although four segments are shown, more or less could be used and they could be of varying lengths.

FIGS. 8–15 show another embodiment of a warning device according to the present invention. The warning device 100 may include an adhesive layer 102 for securing the device to a vehicle. Alternatively, if the device 100 is included in the manufacture of the vehicle, it may be riveted into place. The warning device further includes a sensing device 104 which senses if the vehicle has reached a certain tilting angle. The warning device further includes a signaling device 108 which responds to information received by the sensing device 104. The signaling device 108 and sensing device 104 are electronically connected via connector 106. A switch within the sensing device 104 is set off if a particular angle of the vehicle is reached, such as angle 90-A. When angle 90-A is reached, signaling device 108 is activated. Signaling device 108 may use a noise producer such as a beeper or a buzzer which can be heard through openings 112 in signaling device 108 or a light 110, or both, to gain the attention of the driver and indicate to the driver that angle 90-A is reached. Alternatively, the signally device 108 may include a vibrator located to contact the rider. Such signaling device 108 may be located on a portion of the seat, the handles or any portion of the frame that the rider contacts. This information can then be used by the driver to correct the angle of the vehicle relative to the ground before the vehicle is either damaged by tipping over or by contacting a non-rotating portion of the vehicle with the ground. That is, the operator can correct the angle of the vehicle prior to the vehicle tilting at the dangerous angle of 90-B.

Figure 10:
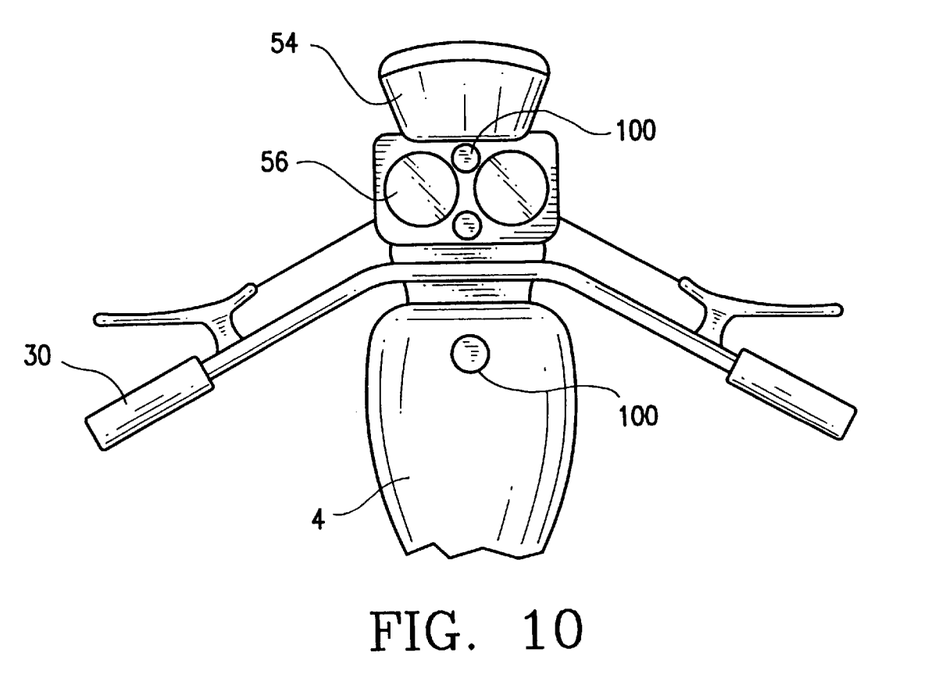
FIG. 10 shows a top partial view of a motorcycle using the warning device of FIG. 8.
Figure 11:
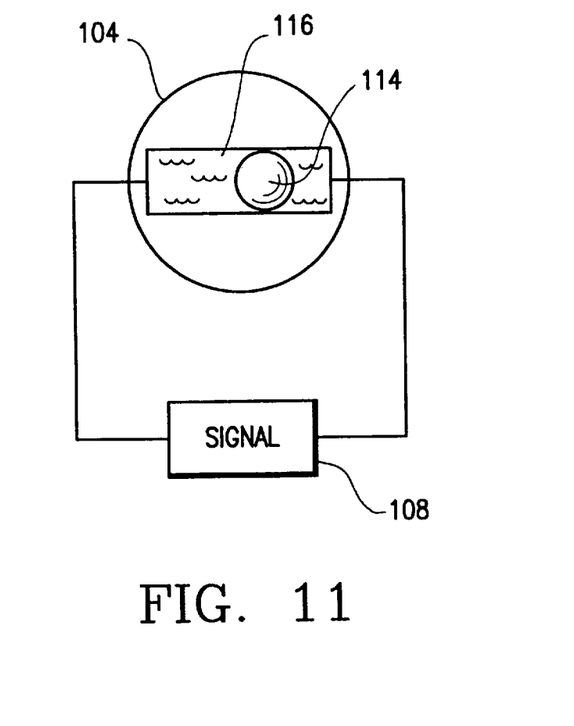
FIG. 11 shows a schematic view of one embodiment of the warning device of FIG. 8.
Figure 12:
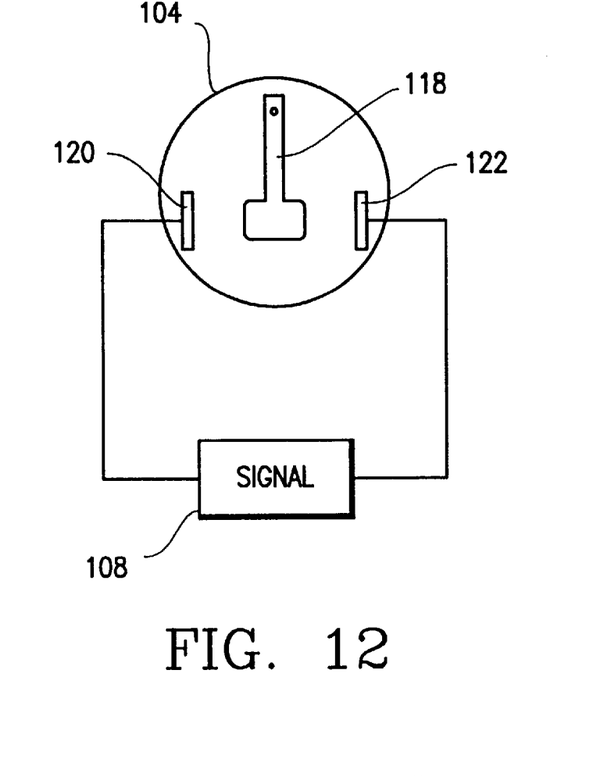
FIG. 12 shows a schematic view of another embodiment of the warning device of FIG. 8.

FIG. 10 shows two exemplary locations where the warning device 100 may be positioned. The warning device 100 is shown positioned amidst the gauge meters 56 and on the body 4. The warning device 100 may be positioned anywhere else on the vehicle where the sensing device 104 is at "zero" when the vehicle is perpendicular to the ground. As shown in FIG. 11, the sensing device 104 may be a bubble 114 within a tube of fluid 116. Alternatively, as shown in FIG. 12, the sensing device 104 may be a pendulum 118. In either embodiment when the bubble 114 or the pendulum 118 makes contact with one of switches 120 and 122, the signaling device 108 is activated. Although the warning device 100 is shown as a unitary device in FIG. 8, the sensing 104 and signaling 108 components may be separated and the sensing device 104 may be positioned at some less visible part of the vehicle with connector 106 running through a wire to signaling device 108 which is still positioned prominently within the driver's view or ear shot. Such a configuration would be slightly less bulky in the area of view. Alternatively, the unitary design shown in FIG. 8 could be maintained and exterior portions of the device 100 could be made transparent so that the sensing device 104 is visible to the driver, so that the driver can actually view the pendulum 118 or bubble 114 for consistent monitoring of the vehicle's angle relative to its upright position.

The warning device of FIGS. 8–12 could be designed to set off the signal at different angles. Thus, for example, different devices could be sold which activate when moved 25°, 30°, 35°, and 45° degrees from the upright position. A more skilled driver may choose a device that does not signal until it is moved 45° while a less experienced driver may prefer to be notified when the motorcycle is angled just 25°.

Figure 13:
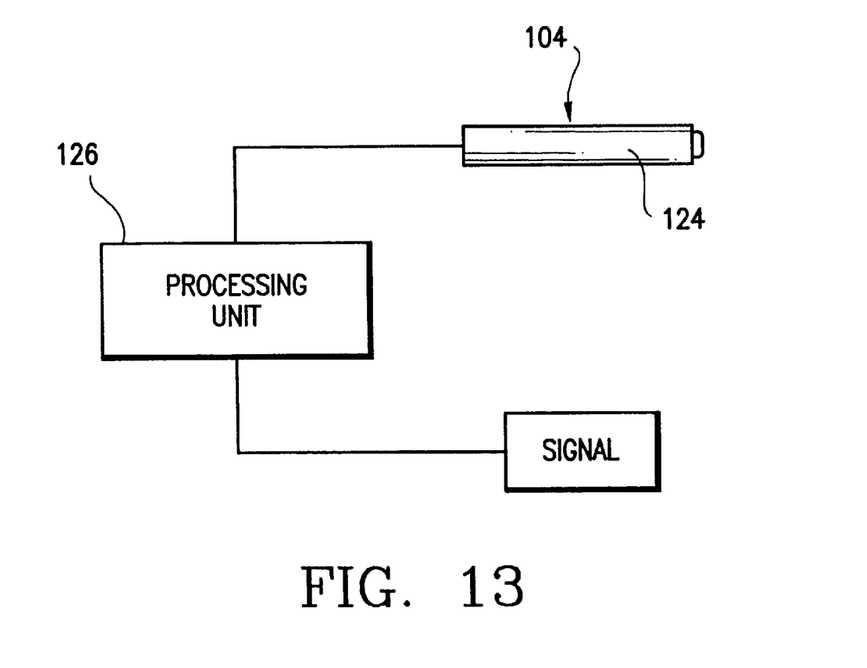
FIG. 13 shows a schematic view of another sensing and signaling device combination for a warning device of the present invention.
Figure 14:
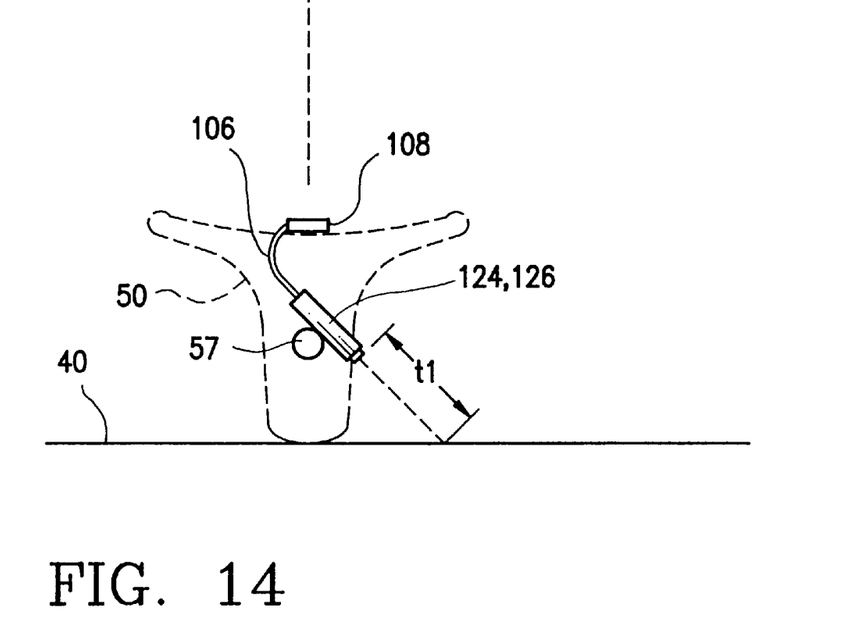
FIG. 14 shows a front view of the warning device of FIG. 13 employed on a vehicle.
Figure 15:
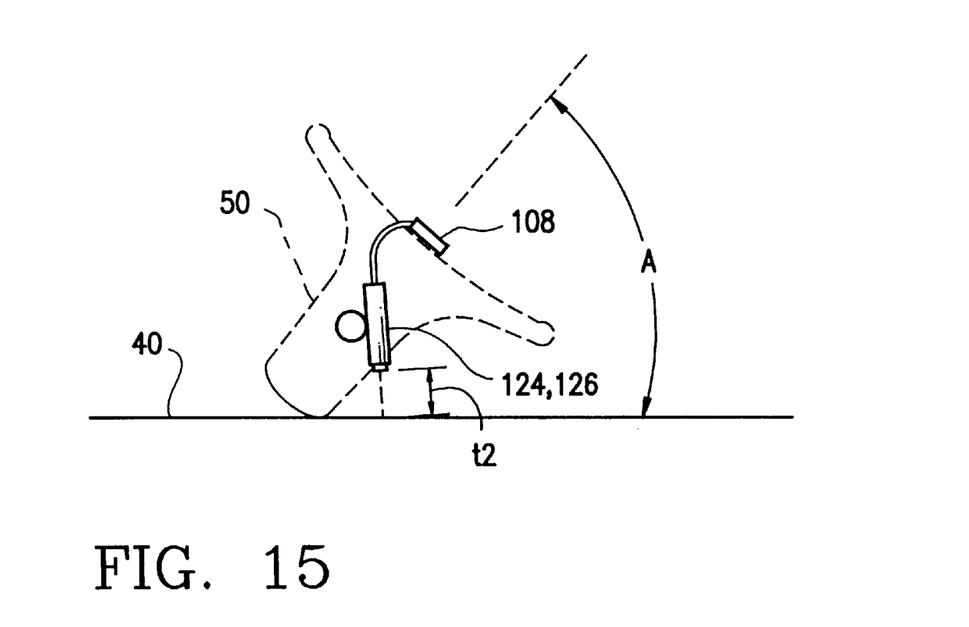
FIG. 15 shows a front view of the warning device of FIG. 13 employed on a vehicle where the vehicle is angled towards the ground.

FIG. 13–15 show another embodiment of a sensing device 104. The sensing device 104 in this embodiment employs a proximity sensor 124 and a processing unit 126. Proximity sensors are well known devices which are used to detect the distance from the sensor to an object and commonly employ ultrasound technology. In an ultrasound embodiment, ultrasound is transmitted from an emitter which may be separate or part of the sensor, bounces off the target, and is received by the sensor. The time it takes to do so is detected by the sensor. Thus, if it takes more time for a sound wave to return to the sensor from an object Q than it does from an object R, then object Q is further away from the sensor than object R.

In this application, the proximity sensor 124 may be attached to the vehicle 50 such that the sensor points away from the vehicle 50. Although exact positioning is not critical, the sensor should point in such a way that changes in the vehicle's angle relative to the ground can be detected. One such positioning is shown in FIGS. 14 and 15. Although the proximity sensor 124 is shown as a single unit, it should be understood that the sensor 124 includes both a transmitter and a receiver, and that these elements could be included in separate housings. Thus, the term sensor in the present application is intended to include both the transmitter and the receiver. The sensor 124 may be attached to a bar 57 on the vehicle 50. As shown in FIG. 14, the sensor 124, which may use ultrasound technology as described above, is detecting a timespan t1 for a sound to return to the sensor 124 when directed from its location on the vehicle 50 to the ground 40. As can be well understood, as the angle between the vehicle 50 and the ground 40 gets smaller and smaller, the detected timespan also gets smaller. When angle A is reached, the sensor 124 detects a timespan t2 which matches a timespan t2 set in the processing unit 126. This match activates via connector 106 the signaling device 108, whether it be a buzzer, beeper, or lighted bulb. While this embodiment of the sensing device 104 may be more accurate than the pendulum or fluid bubble embodiments, two sensors 124 must be positioned on either side of the vehicle 50 to detect proximal distances when angling the vehicle in either direction. The two sensors 124 could, however, lead to the same signaling device. Also, for greatest accuracy, such an embodiment would be best installed by the manufacturer.

Although the sensor 124 is described as emitting ultrasound, other types of emitters and receivers can be used for the proximity sensor. For example, an emitter could emit light, utilizing fiberoptic or laser light technology, or magnetic waves, instead of the sound waves described above, and could be received by the proximity sensor. Light could be received by a photoelectric sensor which can detect, using photocells, the change in angle of a received light beam. The magnetic waves could similarly be received by a sensor. These and alternate types of proximity sensors are off the shelf type items which can be incorporated into the present invention.

The sensing device 104 may be connected to a computer or microprocessor to forward a signal corresponding to the angle of the motorcycle, wherein the computer responds to the sensing device 104 to generate the alarm signal. The computer may incorporate the processing unit 126. It is contemplated that the computer may extrapolate from the sensing device signal and the speed of the motorcycle to provide a warning signal to the rider, prior to actually attaining the critical angle. The computer thus allows the system to anticipate the position of the motorcycle and provide further information to the rider.

A method adapted to be employed by a driver of a motorcycle for detecting an approaching critical angle of the motorcycle so that the driver may correct the angle of the motorcycle while driving to prevent tipping and to prevent a non-rotating portion of the motorcycle from contacting the ground is thus made apparent. The method would essentially comprise the steps of attaching a sensing device to a motorcycle, sensing an approaching critical angle with the sensing device, receiving an auditory or visual signal of the approaching critical angle, and moving the motorcycle to prevent tipping.

With the preferred embodiments of a warning device of the present invention, the step of attaching a sensing device to a motorcycle could comprise either clipping a wire whisker to a bar of the motorcycle, attaching the sensing device to a portion of the motorcycle which would center the pendulum between two contacts or a bubble within a fluid tube, or attaching a first proximity sensor to the motorcycle with a transmitting and receiving side of the sensor facing in a first direction and attaching a second proximity sensor to the motorcycle with a transmitting and receiving side of the sensor facing in a second direction, opposite to the first direction.

The foregoing description of the preferred embodiments of the invention have been presented for purposes of illustration and description. It is not intended to be exhaustive or to limit the invention to the precise forms disclosed, and many modifications and variations are possible in light of the above teachings. The preferred embodiments were chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. A motorcycle warning device adapted for signaling a motorist of an approaching critical tilting angle of a motorcycle relative to the ground, the device comprising:
    a sensing device for sensing an angle of a motorcycle; and,
    a signaling device for signaling to the motorist that a predetermined angle of the motorcycle has been reached while permitting continued operation of the motorcycle;
    wherein the sensing device is a proximity sensor which activates the signaling device when the motorcycle reaches the predetermined angle, and the predetermined angle, measured from the ground to the motorcycle, is less than 90 degrees but greater than the critical tilting angle.

2. The motorcycle warning device of claim 1 wherein the signaling device produces an auditory signal.

3. The motorcycle warning device of claim 2 wherein the auditory signal is a beeper.

4. The motorcycle warning device of claim 2 wherein the auditory signal is a buzzer.

5. The motorcycle warning device of claim 1 wherein the signaling device produces a visual signal.

6. The motorcycle warning device of claim 5 wherein the visual signal is the lighting of a bulb.

7. The motorcycle warning device of claim 1 wherein the signaling device produces both an auditory and a visual signal.

8. The motorcycle warning device of claim 1 wherein the sensor includes a transmitter and a receiver.

9. The motorcycle warning device of claim 8 wherein the transmitter transmits ultrasound and detects a timespan for the ultrasound to be received by the sensor, the sensor further comprises a processing unit for matching the timespan detected by the receiver with a predetermined timespan which would be detected at the predetermined angle.

10. The motorcycle warning device of claim 1 wherein the sensing device comprises two proximity sensors, the sensors pointing in opposite directions from each other.

11. The motorcycle warning device of claim 1 wherein the device is a unitary device.

12. The motorcycle warning device of claim 11 wherein the device is multilayered with the sensing device on a bottom of the device and the signaling device on a top of the device, and further comprising a layer of adhesive material on the bottom adapted to secure the device to the motorcycle.

13. The motorcycle warning device of claim 11 wherein at least some exterior portions of the device are transparent so that the motorist can view movement of the sensing device.

14. A motorcycle warning device adapted for signaling a motorist of an approaching critical tilting angle of a motorcycle relative to the ground, the device comprising:
- a sensing device for sensing an angle of a motorcycle; and,
- a signaling device for signaling to the motorist that a predetermined angle of the motorcycle has been reached while permitting continued operation of the motorcycle;
- wherein the sensing device comprises:
  - a body having a proximal end and a distal end;
  - an attachment device attached to the proximal end of the body, the attachment device adapted to attach the device to a motorcycle; and,
  - a wire whisker at the distal end of the body,
- and wherein the predetermined angle, measured from the ground to the motorcycle, is less than 90 degrees but greater than the critical tilting angle.

15. The motorcycle warning device of claim 14 wherein the sensing device further comprises a switch adapted to activate the signaling device, the switch movable between an open and a closed position by a pressure exerted on the whisker.

16. The motorcycle warning device of claim 15 further comprising a pivotal attachment between the clip and the motorcycle for selecting an angle between the clip and the body.

17. The motorcycle warning device of claim 16 wherein the pivotal attachment comprises ratcheting teeth on a joint and at least one catch on a seat for the joint for retaining a selected angle between the clip and the body.

18. The motorcycle warning device of claim 15 wherein the attachment device comprises a tension clip, the clip having a first arm and a second arm which can be spread apart from a biased position to accept a bar and allowed to return to the biased position to retain the bar therebetween.

19. The motorcycle warning device of claim 18 further comprising a layer of non-slip material positioned on an inside of the first and second arms.

20. The motorcycle warning device of claim 19 wherein the non-slip material is an elastomeric rubber.

21. The motorcycle warning device of claim 18 further comprising a turn screw and nut for pushing the first arm closer to the second arm.

22. The motorcycle warning device of claim 15 wherein the body is telescopic.

23. The motorcycle warning device of claim 15 wherein the wire whiskers are made from steel and are substantially unbendable.

24. A method adapted to be employed by a driver of a motorcycle for detecting an approaching critical angle of a motorcycle so that the driver may correct the angle of the motorcycle while driving to prevent tipping and to prevent a non-rotating portion of the motorcycle from contacting the ground, the method comprising the steps of:
- attaching a sensing device to a motorcycle;
- sensing an approaching critical angle with the sensing device comprising a proximity sensor;
- receiving an auditory or visual signal of the approaching critical angle; and,
- moving the motorcycle while continuing to drive the motorcycle to prevent contacting a non rotating portion of the motorcycle with the ground.

25. The method of claim 24 wherein the step of attaching a sensing device to a motorcycle comprises clipping a wire whisker to a bar of the motorcycle.

26. The method of claim 25 wherein the step of clipping comprises prying a first arm apart from a second arm and placing the first and second arms about the bar.

27. The method of claim 25 wherein the step of sensing an approaching critical angle comprises applying a pressure to the whisker and moving a switch from an open to a closed position.

28. The method of claim 24 wherein the step of attaching a sensing device to a motorcycle comprises attaching a first proximity sensor to the motorcycle with a transmitting and receiving side of the sensor facing in a first direction and attaching a second proximity sensor to the motorcycle with a transmitting and receiving side of the sensor facing in a second direction, opposite to the first direction.

29. The motorcycle warning device of claim 1, wherein the sensor measures a distance between the ground and the motorcycle.

* * * * *